3,580,727
PROCESS FOR MAKING EXPANDED
SNACK PRODUCT
Clayton O. Gulstad, Coon Rapids, Minn., assignor to
General Mills, Inc.
No Drawing. Filed Aug. 28, 1967, Ser. No. 663,503
Int. Cl. A23l 1/10
U.S. Cl. 99—81          11 Claims

ABSTRACT OF THE DISCLOSURE

A new food product and process for making it by explosively puffing grain kernels which have been tempered with a hull modifying and flavoring agent, milling the puffed grain into flour or meal, mixing the flour with water to make a dough which is formed into chips, and subjecting the chips to intense heat.

---

The present invention relates to a novel food product and to a process for making such a food product. More specifically, it pertains to an improved process for making a food product from a dough which includes a starch containing cereal grain which has been tempered with a flavoring ingredient prior to forming the dough; the starch being at least partially gelatinized after the tempering step.

Various apparatus and processes have been devised for forming edible snack food products from a composition which includes a starch containing cereal, in which the starch is processed so that it is at least partially gelatinized. According to the known prior art, one common way of gelatinizing the starch is to cook the grain at an elevated temperature for a prescribed period of time. In some instances the grain is cooked at atmospheric pressure, while in other instances the grain is cooked under pressurized conditions. The length of time required to cook the grain varies of course, and is dependent upon the degree of gelatinization desired, the temperature and pressure at which the cooking takes place, the specific grain being cooked, and the like. In many instances, an extensive period of time is required to obtain a cooked product having the desired characteristics, which can subsequently be formed into a specific type of snack product. Although a number of snack products are known which vary according to taste, texture, color, size and shape, constant efforts are being made to form new products which differ in one way or another from those which are already available, and which overcome the disadvantages and problems involved in producing them.

Accordingly, one object of the present invention is to provide an improved process for forming a new food product.

Another object is to provide a process for forming a food product which is formed from a cereal dough in which the starch is at least partially gelatinized.

A further object is to provide a novel process for forming an edible snack product having excellent texture and eating qualities.

A still further object is to provide an improved process for forming an edible snack product from a dough which includes a tempered cereal grain, the starch in the grain being at least partially gelatinized.

A further object is to produce a novel edible food product.

Other objects and advantages of this invention will become apparent from a consideration of the following detailed description of the invention.

In general, the invention involves preparing a flour which is at least partially gelatinized, by explosively puffing a cereal grain which has been tempered with a flavoring ingredient, and thereafter milling the puffed grain so that a pulverulent material or flour is formed. The flour thus formed can be cooled, dried, and stored for future use, or it can be immediately further processed to form a desired food product. To form such a product, the flour is combined and mixed with a prescribed amount of water to make a dough which is then formed into pieces having a desired size and shape. The pieces are then subjected to intense heat to form the finished food product.

Although a number of specific examples are described hereinafter which illustrate how the product is made, the process is basically the same for each example. The apparatus used for performing each operation are commercially available items, and while a specific kind or type of apparatus might be specified, it must be realized that any number of similar devices might be satisfactorily used as well.

Since the herein described food product is formed from a dough which includes a cereal grain, one of the first factors to be considered is what type of grain is to be used. Any number of starch containing grains can be used, including for example, corn, rice, wheat, barley, oats, etc., as well as mixtures of two or more of them. For illustrative purposes, the invention will be described by using corn as the cereal grain.

The corn is explosively puffed in a puffing gun in a manner well known to those skilled in the art. Any type of gun puffing apparatus can be used, as the corn can be puffed in either a batch or a continuous puffing gun. Moreover, the corn can be expanded into a vacuum or into atmospheric pressure. As known, the corn is puffed by sudden release from a heated confined area into an area having a larger volume and a lower pressure; such a puffing operation causes the starch in the corn to gelatinize. The extent of starch gelatinization of course, depends on the specific processing conditions used. It has been found in the present instance, that satisfactory product results are obtained when the amount of gelatinization varies from as low as 40%, to complete gelatinization. It should be realized of course, that the texture and quality of the final product will vary to some extent, dependent upon the amount of starch damage incurred during the puffing step. As known to those skilled in the art, there are various methods and procedures known for determining the amount of starch gelatinization which has been achieved. No detailed description of such procedures will be described herein.

For purposes of illustration, U.S. Pat. 3,231,387 illustrates a puffing gun which can be used with desirable results. In such an apparatus, the feed material is continuously fed through a rotary valve into a long puffing gun and is discharged from the end of the puffing gun. In a typical operation, the grain is fed into the chamber at a feed rate which ranges from 10 to 30 pounds per minute, along with steam at about 40–130 p.s.i.g., and preferably about 100 p.s.i.g., at a temperature ranging from about 300–500° F. The barrel is sometimes maintained at a temperature of about 500–700° F. The grain is maintained in the gun for about 15–120 seconds and discharged continuously to yield a puffed or expanded product which is somewhat larger than the original grain. The starch of such a puffed product is at least partially gelatinized and in many instances, complete gelatinization can be achieved.

Where a batch gun is used, the moisture of the feed material is preferably somewhat higher than normally used in a continuous puffing operation. Batch gun conditions are in the range of the following: gun temperature 325–750° F., internal pressure 80–125 p.s.i.g., residence time 3–15 minutes.

The corn is first tempered or steeped with a flavoring and hull modifying agent. It is known to temper corn kernels for a period of time in order to soften their hulls, with agents such as calcium hydroxide, sodium hydroxide, sulfuric acid, or the like. In the present invention, such an agent is also used as a flavoring agent; thus, it has been found that lime works with excellent results. Generally, the lime is employed in the range of about 0.10–1.0%, and preferably about 0.25%, by weight, based on the dry weight of the corn. It must be realized of course, that higher or lower amounts of lime might be used if desired. The length of time required for tempering can vary, from 4–24 hours for example. The amount of water added can likewise vary; in this regard it has been found that enough water should be added to the corn so that its moisture content is raised to about 15–30%, and preferably about 20%.

Following the tempering step, the corn is introduced into the puffing gun at a prescribed feed rate. The moisture content of the corn when introduced into the puffing gun should preferably range from about 18–22%. If the moisture level is higher than this amount, the corn should be dried so that its moisture content is within the designated range. The corn is retained within the gun for about ½–2 minutes, and preferably about 1 minute. When discharged from the gun, the kernels are expanded about 1½–3 times, the moisture content is reduced to about 17%, and gelatinization of the starch from about 40–100% is obtained, depending upon the specific processing conditions employed.

The puffed corn is discharged from the gun at a fairly high temperature, e.g., 120–150° F.; consequently, it might be necessary or desirable to cool the puffed product. This is particularly true if the puffed product is to be stored for a period of time before it is further processed. Any known method of cooling the product can be employed to lower the temperature to a suitable level, e.g., room temperature. If the product is to be immediately processed further, such cooling might not be necessary or desirable.

After the grain has been puffed, it is admitted into a mill where it is ground into a flour. Various types of well known and commercially available reduction mills can be used with satisfactory results for milling the puffed grain. Mechanical impact mills having hammers and/or whizzers therein which impact against the particles and aid in moving them through the grinding chamber are commonly known and used for grinding purposes. Mills which might be used include Fitzpatrick Mills, Raymond Vertical Mills, Schutz-O'Neill Mills, Alpine Pin Mills, and the like. As known to those skilled in the art, such machines include a plurality of hammers and/or whizzers which are mounted within a grinding chamber in such a manner that the hammers are caused to rotate about a prescribed axis. The material to be pulverized is introduced into the chamber where the particles are accelerated to a high speed by the rotating hammers and reduced in size by attrition with the hammers and the walls of the grinding chamber. The particle size distribution of the flour is not overly critical, and its size range might vary, dependent upon the specific grain being used, the other equipment being used in the process, the desired texture of the final food product, and the like. Generally, it has been found that best results are obtained if the particle size is less than about 2500 microns.

Following the grinding operation, a dough is formed by combining and mixing the milled flour with water. Flour, having a moisture content ranging from about 10–15%, is admitted into a mixer, such as a commercial size Hobart blender Model No. M-802, along with enough water to raise the moisture content to a prescribed level. The amount of water to be added will vary dependent upon the amount of moisture desired in the mixed dough. It has been found that for a given amount of flour, its total moisture content, including its original moisture content, should range from about 30–50%, and preferably about 43%, based on the total weight. The flour and water are mixed together for about 15–20 seconds in the blender in order to uniformly blend the flour and water together, and are then transferred to a mixer-extruder device, such as an Extructor Model No. RE-6-H55424, manufactured by Rietz Manufacturing Co. of West Chester, Pa., at a prescribed feed rate. As known, the latter device works the dough and forms it into an elastic and pliable high density rope by forcing it through an orifice or die opening. The rope is then rolled or flattened into a sheet by feeding it between a pair of sheeting rolls. The sheeted dough is then cut and formed into pieces having a desired shape. Various methods and types of apparatus are known and can be devised to form the pliable and elastic dough sheet into pieces of desired shape and size; the particular method or apparatus used is not significant in the present invention. The thickness of the dough when sheeted should range from about 0.025 to 0.070 inch, and preferably about 0.040 inch. If desired, the sheets can be perforated with small holes either before or after the individual pieces are cut or stamped out. It should be realized of course, that other types of equipment might be used for forming the dough into pieces, such as continuous screw extruders.

Following the formation of the dough into pieces, the pieces or chips, which have a moisture content ranging from about 30–40%, are subjected to intense heat for a short period of time. Although a number of methods can be used for finishing the product, such as salt puffing, or vacuum puffing, it is preferred that the product be deep-fat fried. The chips are fried at about 350–400° F. for a time period of about 50–80 seconds. This normally reduces the moisture content of the chips to a range of about 1–3%; and results in very little puffing of the chips. The chips are then removed from the deep fat fryer, dusted with salt so that about 1½–2% by weight of salt is obtained, and then allowed to cool. The oil content of the final product should preferably range from about 20–40%, although higher or lower amounts might be satisfactory as well. After cooling to a desired temperature, the product is either immediately packaged, or it can be stored for future packaging.

The invention will be better understood with reference to the following example:

EXAMPLE I

One hundred pounds of dry yellow corn having a moisture content of about 11.4%, were tempered with a lime-water slurry formed of 0.25% lime (based on a dry corn weight basis) and enough water to raise the moisture content of the corn to about 20%. The corn was permitted to temper for about 4 hours. After tempering, the limed corn was fed into a continuous puffing gun at a feed rate of about 10 pounds per minute. The following gun conditions were employed:

Steam pressure _____ 80 p.s.i.g.
Steam temperature _____ 405° F.
Barrel angle—below horizontal _____ 2°.
Barrel rotation _____ 28 r.p.m.
Barrel temperature _____ 700° F.
Puffing gun orifice diameter _____ ½ inch.
Barrel size _____ 10 inch diameter x 12 feet long.

During the puffing operation the kernels were expanded to about 1½ to 2 times their original size, they were substantially completely gelatinized, and their moisture content was reduced to about 17%.

After puffing, the kernels were milled into flour by passing them through a Fitz mill using a 2B screen. A sieve size analysis of the milled product (200 gm. sample sieved 2 minutes on an Allis Chalmers test sifter) gave the following results:

TABLE I

| Through | Over | Percent product |
|---|---|---|
|  | 12 wire (1,580μ) [1] | 40.4 |
| 12 wire | 16 wire (1,400μ) [1] | 23.4 |
| 16 wire | 28 wire (650μ) [1] | 14.8 |
| 28 wire | 43 wire (485μ) [2] | 6.6 |
| 43 wire |  | 14.8 |

[1] Tinned mill wire.
[2] Stainless steel free bolting wire.

A dough was then formed by combining and mixing 7250 grams of the above flour, having a moisture content of about 13%, with enough water to raise the moisture content of the dough to about 43%. These ingredients were first blended together in a Hobart blender for about 15 seconds in order to uniformly mix the water and flour together, and then continuously fed into a mixer-extruder device at a feed rate of about 5 pounds per minute. The latter apparatus formed the dough into a high density rope having a diameter of about 1½ inches, by forcing it through an appropriate opening; the rope thus formed was quite elastic in nature. The rope was then fed through a pair of counter-rotating sheeting rolls to form a sheet about 0.040 inch thick. Pieces or chips having a desired configuration were then cut from the sheet material by an appropriate cutting mechanism.

The chips, which had a moisture content of about 38%, were then deep fat fried in coconut oil at a temperature of about 380° F. for about 75 seconds. Very little expansion of the chips occurred during frying. The moisture content of the fried chips was reduced to about 1½% and they had an oil content of about 34% by weight. After frying, the chips were dusted with salt so that about 1½% by weight was added to the product. The product thus produced, exhibited excellent characteristics as to taste, texture, and appearance.

EXAMPLE II

Example I was repeated except that the pieces or chips were deep fat fried in an oil mixture formed of 50% cotton seed oil and 50% soybean oil, rather than coconut oil. The temperature of the oil was about 380° F., and the chips were fried for about 65 seconds. The fried chips when salted, had a slightly different flavor when compared to those fried in accordance with Example I, but they were savory and quite pleasant to eat.

EXAMPLE III

One hundred pounds of dry yellow corn having a moisture content of about 12.9% were tempered with a lime-water solution formed of 0.35% lime (based on a dry corn weight basis) and enough water to raise the moisture content of the corn to about 20%. The corn was permitted to temper for about 16 hours. After tempering, the limed corn was introduced into a continuous puffing gun at a feed rate of about 10 pounds per minute. The following gun conditions were employed:

Steam pressure ------------------ 92 p.s.i.g
Steam temperature --------------- 335° F.
Barrel angle—below horizontal ---- 2°.
Barrel rotation ------------------ 28 r.p.m.
Puffing gun orifice diameter ------ ½ inch.
Barrel size ---------------------- 10 inch diameter x 12 feet long.

In this instance, note that no external heat was applied to the barrel. During the puffing operation the kernels were expanded slightly, and a lesser amount of starch gelatinization was achieved, i.e., about 79%. The moisture content of the puffed corn was about 21%.

After puffing, the kernels were milled into flour by passing them through a Fitz mill using a 2B screen. A sieve size analysis of the milled product (100 gram sample sieved 5 minutes on a Ro-Tap sifter) gave the following results:

TABLE II

| Through | Over [1] | Percent product |
|---|---|---|
| 0 | 25 wire (710μ) | 18.1 |
| 25 wire | 45 wire (350μ) | 40.7 |
| 45 wire | 60 wire (250μ) | 10.3 |
| 60 wire | 70 wire (210μ) | 3.8 |
| 70 wire | 100 wire (149μ) | 9.8 |
| 100 wire |  | 17.3 |

[1] U.S. Standard Screen.

Seventy five hundred grams of the above flour, having a moisture content of about 13%, were combined and mixed with enough water to raise the moisture content of the resulting dough to about 40%. The flour and water were first blended together in a Hobart blender for about 15 seconds, and then continuously fed into a mixer-extruder device at a feed rate of about 5 pounds per minute to form an elastic, high density rope. The rope was then fed through a pair of counter-rotating sheeting rolls to form a sheet about 0.040 inch thick. Pieces having a desired configuration were then cut from the sheet material by an appropriate cutting mechanism.

The cut pieces, which had a moisture content of about 36%, were then deep fat fried in coconut oil at a temperature of about 380° F. for about 65 seconds. Very little expansion of the product occurred during frying. The moisture content of the fried product was reduced to about 1½% and it had an oil content of about 25% by weight. After frying, the pieces were dusted with salt so that about 1½% by weight was added to the product. The resulting product, while slightly coarser in texture and slightly different in taste when compared to the product formed in Example I, had a pleasing flavor, and a crispy, crunchy, texture.

EXAMPLE IV

Two hundred and forty pounds of dry yellow corn having a moisture content of about 13%, were tempered for about 16 hours with a lime-water solution formed of 0.35% lime (based on a dry corn weight basis) and enough water to raise the moisture content of the corn to about 20%. The tempered corn was then fed into a continuous puffing gun at a feed rate of about 10 pounds per minute. The following gun conditions were used:

Steam pressure ------------------ 40 p.s.i.g.
Steam temperature --------------- 290° F.
Barrel angle -------------------- 2°.
Barrel rotation ------------------ 36 r.p.m.
Puffing gun orifice diameter ----- ½ inch.
Barrel size --------------------- 10 inch diameter x 12 feet long.

As noted, no external heat was applied to the barrel. The puffed corn had a moisture content of about 21%, and about 47.5% starch gelatinization was obtained.

After puffing, the corn was dried to a moisture content of about 11%, and then milled into flour having a maximum particle size of about 200 microns, by feeding it into an Alpine Kolloplex Mill, Model No. 160Z, which operated at a rotor speed of about 19,000 r.p.m. The flour thus produced had a moisture content of about 9%.

A dough was then formed by mixing the flour with enough water to raise the moisture content of the resulting dough to about 35%. The mixing was first done in a Hobart blender for about 15 seconds; the dough was then formed into a flat extrudate about 1 inch wide and 0.047 inch thick, by forcing it through a continuous screw extruder having a slit die opening, at a pressure of about 2600 p.s.i.g. The temperature of the extrudate was about 127° F. The extrudate was immediately cut into segments about 1½ inch long.

The chips thus formed were deep fat fried in coconut oil at a temperature of 380° F. for 60 seconds, and then dusted with salt so that about 1½–2% by weight was added. The oil content of the finished chip was about 17.7%, and it had a moisture content of about 1.7%. This product was likewise considered quite delectable.

In the above description, a disclosure of the principles of this invention is presented, together with some of the specific examples by which the invention may be carried out.

Now, therefore, I claim:

1. A process for forming a food product which comprises explosively puffing corn kernels which have been tempered with a solution containing calcium hydroxide as a hull modifying and flavoring agent by subjecting the corn to an elevated temperature and pressure, and instantaneously releasing said pressure whereby steam explosion of the corn is obtained, said puffed corn becoming at least patrially gelatinized during said puffing, forming a pulverulent material by milling said puffed kernels, forming a dough by combining and mixing said material with a prescribed amount of water, forming said dough into pieces having a prescribed size and shape, and subjecting the pieces to intense heat for a prescribed period of time.

2. The process of claim 1 wherein the moisture content of the tempered corn ranges from about 15–30%, and said calcium hydroxide comprises about 0.10–1.0% by weight of the corn.

3. The process of claim 1 wherein the moisture content of the tempered corn ranges from about 18–22% when it is subjected to puffing.

4. The process of claim 1 which includes cooling the puffed corn after it has been explosively puffed.

5. The process of claim 1 wherein the puffed corn is milled into flour having a particle size below about 2500 microns.

6. The process of claim 1 in which water is added to the flour so that the moisture content of the resultant dough ranges from about 30–50%.

7. The process of claim 6 which includes shaping the dough into pieces by forming a thin sheet of dough material, and cutting said sheet into pieces having a prescribed shape and size.

8. The process of claim 7 in which the thickness of said sheet ranges from 0.025 to 0.070 inch.

9. The process of claim 1 wherein said pieces, having a moisture content ranging from 35–40%, are deep fat fried in oil at about 350–400° F. for about 50–80 seconds, the moisture content of said pieces being reduced to about 1–3%, and the oil content of said pieces ranging from about 17–40%.

10. The process of claim 9 which includes applying salt to the pieces after they have been deep fat fried so that about 2% by weight is obtained.

11. A process for forming a food product which comprises tempering a cereal grain with a lime-water solution for 4–24 hours, explosively puffing said tempered grain having a moisture content of 18–22% by subjecting it to a temperature of at least 325° F. and a pressure of at least 80 p.s.i.g. and instantaneously releasing said pressure whereby steam explosion of the cereal grain is obtained, thereby gelatinizing at least 50% of the starch, milling the puffed grain to form a flour having a particle size below 2500 microns, forming a dough by combining and mixing said flour with enough water to raise the moisture content of the dough thus formed to at least 40%, working the dough and forming it into a sheet having a thickness of about 0.025–0.070 inch, cutting the sheet into pieces, deep fat frying said pieces having a moisture content ranging from 30–40% in oil at about 350–400° F. for 50–80 seconds, and applying salt to the fried pieces so that about 1½–2% by weight is applied thereto.

References Cited
UNITED STATES PATENTS

| | | | |
|---|---|---|---|
| 766,212 | 8/1904 | Anderson | 99—82 |
| 1,933,158 | 10/1933 | Bohn et al. | 99—82 |
| 2,002,053 | 5/1935 | Doolin | 99—80 |
| 2,282,783 | 5/1942 | Musher | 99—82 |
| 3,348,950 | 10/1967 | Weiss | 99—81X |

ALVIN F. TANENHOLTZ, Primary Examiner

J. R. HOFFMAN, Assistant Examiner

U.S. Cl. X.R.

99—82, 93

UNITED STATES PATENT OFFICE
CERTIFICATE OF CORRECTION

Patent No. 3,580,727                        Dated    May 25, 1971

Inventor(s)  Clayton O. Gulstad

It is certified that error appears in the above-identified patent and that said Letters Patent are hereby corrected as shown below:

Column 2, line 4, "explosivesly" should read -- explosively --. Column 4, line 53, "example" should read -- examples --. Column 5, Table I under column entitled Over, "1580 µ" should read -- 1680 µ --. Column 7, line 19, "patrially" should read -- partially --.

Signed and sealed this 21st day of December 1971.

(SEAL)
Attest:

EDWARD M. FLETCHER, JR.                ROBERT GOTTSCHALK
Attesting Officer                      Acting Commissioner of Patents